United States Patent [19]

Nissen et al.

[11] Patent Number: 4,591,977
[45] Date of Patent: May 27, 1986

[54] PLURALITY OF PROCESSORS WHERE ACCESS TO THE COMMON MEMORY REQUIRES ONLY A SINGLE CLOCK INTERVAL

[75] Inventors: Stanley M. Nissen, Reading; Chris J. Grobicki, Lexington; William M. Kaupinis, Methuen, all of Mass.

[73] Assignee: The United States of America as represented by the Secretary of the Air Force, Washington, D.C.

[21] Appl. No.: 477,998

[22] Filed: Mar. 23, 1983

[51] Int. Cl.⁴ ............................................. G06F 15/16
[52] U.S. Cl. .................................... 364/200; 364/133
[58] Field of Search ...................... 364/200, 900, 133

[56] References Cited

U.S. PATENT DOCUMENTS

| | | | |
|---|---|---|---|
| 3,337,854 | 8/1967 | Cray et al. | 364/200 |
| 3,445,822 | 5/1969 | Driscoll | 364/200 |
| 3,505,651 | 4/1970 | Barlow et al. | 364/200 |
| 3,715,729 | 2/1973 | Mercy | 364/200 |
| 3,886,525 | 5/1975 | Brown et al. | 364/200 |
| 3,940,743 | 2/1976 | Fitzgerald | 364/200 |
| 4,065,809 | 12/1977 | Matsumoto | 364/200 |
| 4,074,355 | 2/1978 | Tubbs | 364/200 |
| 4,096,571 | 6/1978 | Vander Mey | 364/200 |
| 4,164,787 | 8/1979 | Aranguren | 364/200 |
| 4,212,057 | 7/1980 | Devlin et al. | 364/200 |

Primary Examiner—Gareth D. Shaw
Assistant Examiner—Daniel K. Dorsey
Attorney, Agent, or Firm—Donald J. Singer; William Stepanishen

[57] ABSTRACT

A multi-microprocessor apparatus utilizing a plurality of central processing units arranged in a parallel configuration. Each central processing unit which has its own local memory unit, communicates with a common memory unit on a time shared basis that is synchronized between each central processing unit and the common memory unit.

4 Claims, 3 Drawing Figures

PLURALITY OF PROCESSORS WHERE ACCESS TO THE COMMON MEMORY REQUIRES ONLY A SINGLE CLOCK INTERVAL

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to microprocessors, and in particular to an arrangement of multiple microprocessors which utilize a common memory.

Microcomputers are becoming increasingly important in a wide ranging variety of applications. As economies involved in the production of microprocessors and microcomputers continue to reduce the cost thereof, they will be utilized in more and more applications. It may often times be desirable to utilize more than one processing unit in conjunction with a single memory or a portion thereof. This may be desirable in order to divide the functions performed by a microcomputer among two or more processors in order to increase the capacity of the microcomputer system. Another advantage of a multiprocessor system is that lower cost may be achieved by enabling the implementation of a complex system with two or more relatively low cost processors as opposed to a single more complicated and consequently higher cost processor. A further advantage which may be obtained is that a system may be designed such that, in the event of failure of a single processor a second processor will assume the functions of the failed processor and thus provide a degree of redundancy not found in single processor systems. A still further advantage attendant a multiprocessor microcomputer system is that communications may be established between two or more processors through a shared memory directly accessible to any processor. A system of this type has the capacity for sharing not only data but also programming information and has the further advantage of allowing one processor to control the programming of another by modifying the instructions stored in a single memory. Many microprocessors currently in use are organized according to a bus structure for communication between the microprocessor and the other components of the microcomputer system as, for example, memory and input/output devices. A bus interconnection structure allows the ready modification of a microcomputer system by the substitution of components therein without the need for physical modification of the basic system hardware. Furthermore, the conventional approach to increased capability, involves dedicating a memory to a processor during the processor's entire cycle. While these prior art features are highly desirable, there still exists a need to perform the processor function at still greater speed. The present invention provides such microprocessor operation with a minimal hardware impact.

SUMMARY OF THE INVENTION

The present invention utilizes a plurality of microprocessors each of which access their own local memory as well as share a common memory unit. With respect to each other the microprocessors are arranged in parallel and are each connected to a common memory unit with the microprocessors synchronized to a common clock reference, usage of the bus to the common memory is reduced to a single clock interval for each access.

It is one object of the present invention, therefore, to provide an improved multi-microprocessor apparatus.

It is another object of the invention to provide an improved multi-microprocessor apparatus wherein each microprocessor has its individual local memory unit and a shared common memory unit.

It is another object of the invention to provide an apparatus wherein each microprocessor is synchronized to a to a common clock to permit efficient service by a common memory unit.

It is another object of the invention to provide an apparatus wherein the access for each microprocessor to the common memory unit requires using only a single clock interval on the bus.

It is still another object of the invention to provide an improved apparatus which is economical to produce and utilizes conventional, currently available components that lend themselves to standard mass production manufacturing techniques.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
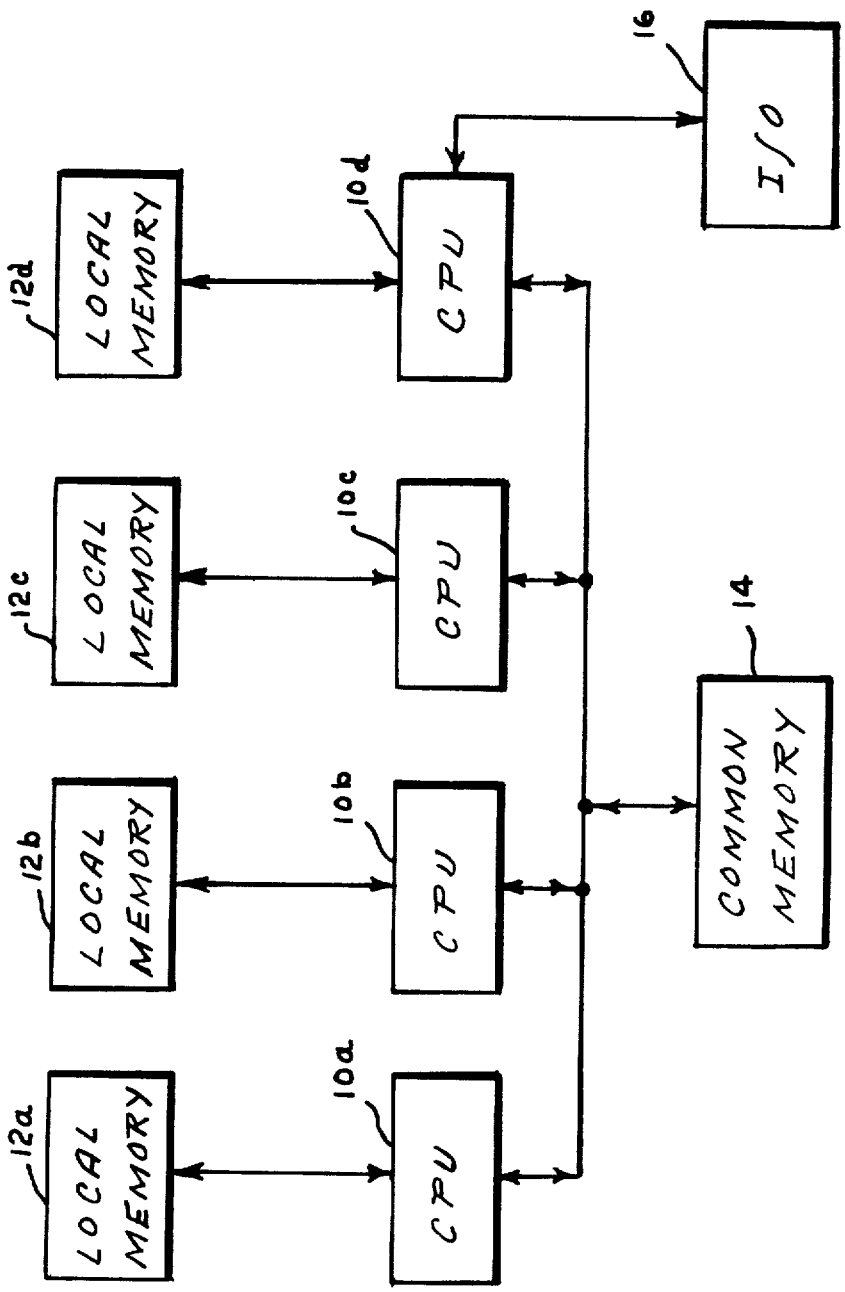
FIG. 1 is a block diagram of the multi-microprocessor apparatus according to the present invention.

Referring now to FIG. 1, there is shown a multi-microprocessor apparatus comprising a plurality of microprocessor units 10a–10d arranged in parallel. Each microprocessor unit 10a–10d has respectively associated therewith its own local memory unit 12a–12d in which there is stored instructions, routines, data, etc. that is peculiar to a corresponding microprocessor unit. A common memory unit 14 is provided for each of the microprocessors 10a–10d to access for instruction and control signals. An input/output unit 16 is utilized to provide user access to the microprocessor units.

The common requirement in the present multiple microprocessor system is the use of a common memory which is accessible, as shown in FIG. 1, to all the processors. The problem with similar prior art systems is the time which is required to allow each processor to use the memory unit while the fast processing of data requires that a minimum of waiting time for a memory operation to be completed, be correspondingly achieved. It may be seen that the present multiple microprocessor system solves this problem with a minimum amount of hardware by synchronizing the processors to a common clock reference by allowing the common memory unit 14 to service three processors during the normal time period for one processor memory cycle.

The present multiple microprocessor apparatus operates in the following manner. It is well known that a microprocessor unit typically uses many clock intervals to perform a memory access routine. In the usual sequence of events, the address is first placed on the multiplexed address data bus to the memory unit. The data is then retrieved from the memory unit. These operations are controlled by timing signals which are provided by the processor unit that is accessing the memory unit and are usually slaved to the edges of the processor clock signal.

Figure 2:
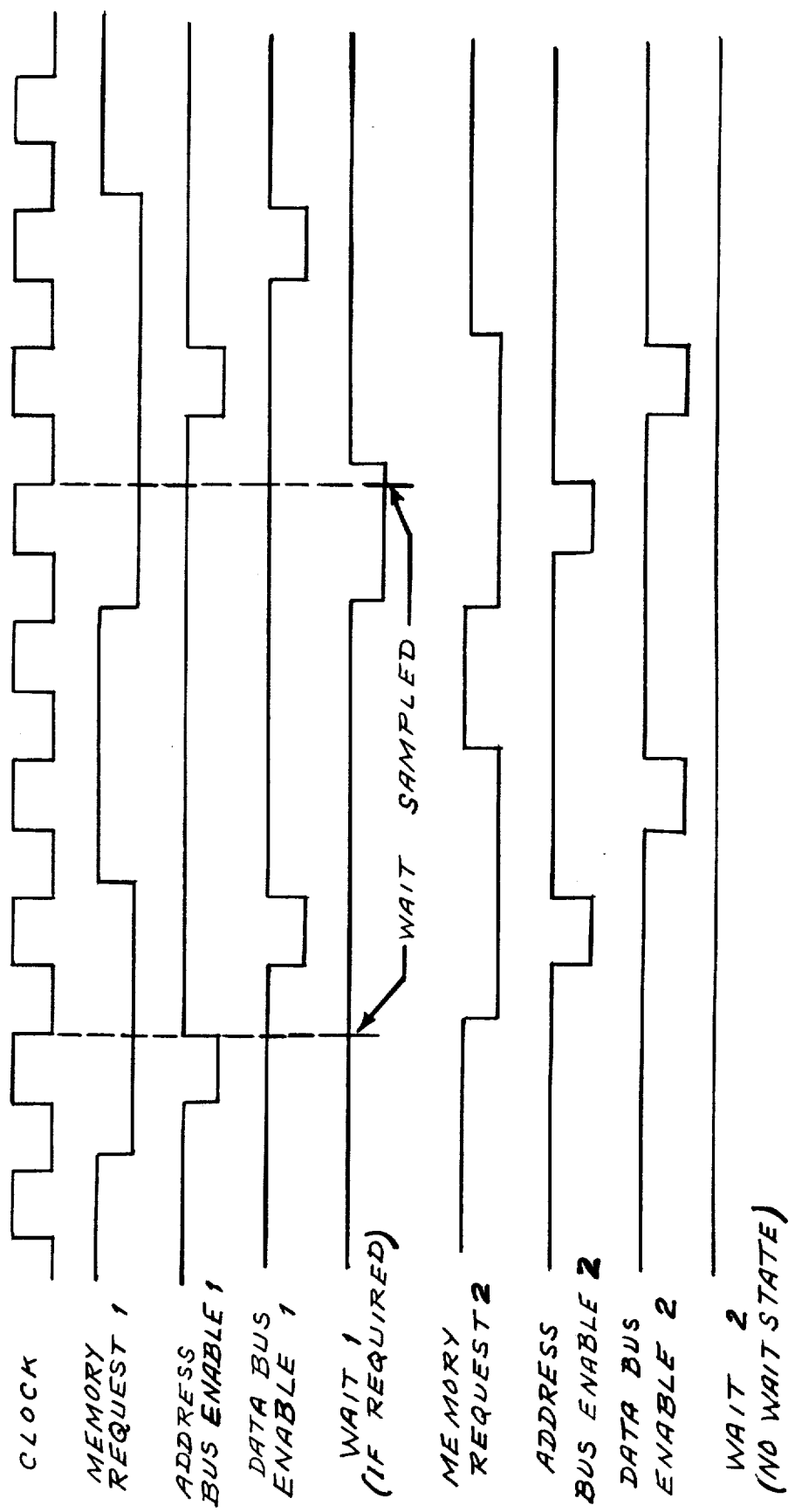
FIG. 2 is a graphical representation of the timing sequence between a pair of microprocessors accessing the common memory unit, and, FIG. 3 is a block diagram which shows in greater detail the central processor unit and the common memory unit.

However, the memory unit, if it is fast enough, can perform the actual operation during one of these clock intervals, wherein there is actually required in most processor systems that three clock intervals are required for such memory operations. Therefore, a processor unit, the Z8000, which normally uses three clock intervals for a memory access, actually has access to the memory unit for an additional two clock intervals. It may be noted in FIG. 2, that one interval is dedicated to address generation and one interval to data generation or utilization. Thus, it may be seen that a second processor unit can begin to address the same memory unit during the first processor's data cycles so that a new access can be performed every clock interval.

The shortest memory reference instruction which may be executed by a processor unit, the Z8000, requires seven clock intervals of which four clock intervals are dedicated to fetching and executing the instruction. Therefore, programs are stored in the processor's local dedicated memory unit, in order that a typical processor will access the common memory unit during every seven or more clock intervals. Thus, it is conceivable that seven processor units could share the same memory unit.

While in the conventional multiple processor system in which the memory unit is dedicated to a processor during the processor's entire cycle, it may clearly be seen that such a multiple processor system would have three times less capacity. The present multiple microprocessor apparatus has an approach to the problem which differs from other previously developed in the manner and techniques as shown and described herein. Specifically, it should be noted that the present multiple microprocessor apparatus is fully synchronous and provides controlled design margins and reliable operations. In addition, the common memory unit is tied up for only one clock interval during a memory cycle, although the processor unit uses three for a memory cycle. It would further appear that modification of existing systems may be accomplished by hardware that is simple and straight forward.

Figure 3:
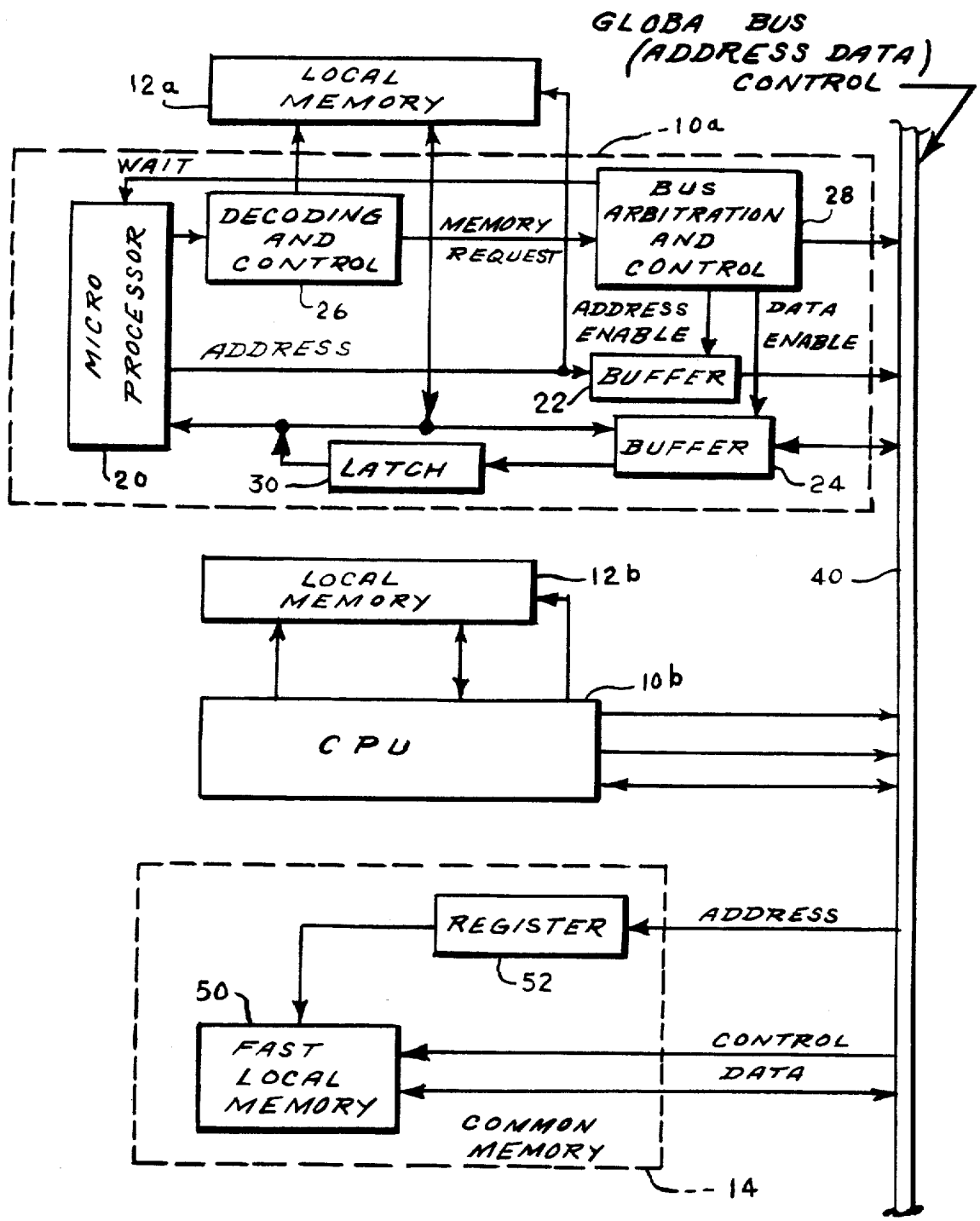

Turning now to FIG. 3, there is shown in greater detail a block diagram of the control processor unit and common memory unit of FIG. 1. As was illustrated in FIG. 1, the local memory unit 12a services only the central processor unit 10a and the local memory unit 12b services only the central processor unit 10b. For purposes of simplicity, only two local memory unit-central processor units have been shown. The description of one central processor unit 10a will be discussed herein since all the central processor units 10a-10d are the same. The central processor unit 10a comprises a microprocessor unit 20 which provides signals to first and second buffer units 22, 24 and a decoding and control unit 26. The first and second buffer units provide signals to the global bus line 40. The decoding and control unit 26 provides a memory request signal to the bus arbitration and control unit 28. The bus arbitration and control unit 28 provides an address enable signal to the first buffer unit 22 and a data enable signal to the second buffer unit 24. The bus arbitration and control unit 28 also provides the memory request signal to the global bus 40 and a wait signal is provided to the microprocessor unit 20. The second buffer unit 24 also communicates with the microprocessor unit 20 by means of latch unit 30.

The common memory unit 14 is shown in greater detail in FIG. 3. The common memory unit 14 typically may comprise a fast local memory unit 50 and a register unit 52. The fast local memory unit 50 transfers and receives data signals to and from the global bus 40, and receives control signals from the global bus 40. The register unit 52 which receives address signals from the global bus 40, applies these signals to the fast local memory unit 50.

With respect to FIG. 3, the central processor unit operates in the following manner. A memory operation begins when a central processor unit or many central processor units initiate a memory operation. The decoding and control unit 26 determines whether the memory request reference is to the local memory unit 12a or to the common memory unit 14. If the reference is to the common memory unit 14, an indication is sent to the bus arbitration and control unit 28. The bus arbitration and control unit 28, in conjunction with all other identical central processor bus arbitration and control units, determines if this central processor unit is entitled to use the global bus next. If it is not, then a wait signal is sent to the central processor unit. If it is, then the address enable signal is activated.

The address is placed on the global bus 40 and stored into the register unit 52 which is associated with the common memory unit 14. The data enable signal is automatically generated by the bus arbitration and control unit 28 on the following clock. The operation at this point depends on the data direction. In a read operation, the common memory unit 14 provides data signal to the global data bus 40. This data signal comes through the data buffer unit 24 at the central processor unit whose data enable signal is activated (in this example central processor unit 10a) and is stored in latch unit 30 which is associated with central processor unit 10a. The central processor unit 10a can now receive the data signal from the latch unit 30.

In a write operation, the data signal is placed on the global bus 40 by the central processor unit 10a through the data buffer unit 24 and is stored by the common memory unit 14, thus completing the transaction. In full operation, new addresses may be placed on the address bus on each new clock. The central processor unit memory cycle which initiates address bus enable, data bus enable and data receipt for a read cycle, may all be occurring simultaneously in four different central process units.

Although the invention has been described with reference to a particular embodiment, it will be understood to those skilled in the art that the invention is capable of a variety of alternative embodiments within the spirit and scope of the appended claims.

What is claimed is:

1. A multi-microprocessor apparatus comprising in combination:

a plurality of central processing units to receive and process data signals, said plurality of central processing units arranged in parallel with one another, each of said plurality of central processing units respectively including a means for synchronizing which is operatively connected thereto to synchronize the flow of data and signals through each central processing unit, said synchronizing means synchronizing each of said central processing units to a common clock reference, a plurality of local memory units respectively connected to said plurality of central processing units, each of said plurality of local memory units storing data, instruction and control signals, each central processing unit of said plurality of central processing units communicating only with its local memory unit of said plurality of local memory units, and, a means for a common memory coupled directly to each of said plurality of central processing units, said common memory means providing data, instruction and control signals to each central processing unit of said plurality of central processing units, the communications between each of said plurality of central processing units and said common memory means being synchronized by its respective synchronizing means wherein access thereto requires only a single clock interval.

2. A multi-microprocessor apparatus as described in claim 1 further including an input/output means respectively coupled to each of said plurality of central processing units for communicating therewith and between.

3. A multi-microprocessor apparatus as described in claim 1 wherein each of said plurality of central processing units communicates with said common memory unit in a random manner which is dependent upon the availability of the common memory unit.

4. A multi-microprocessor apparatus as described in claim 2 wherein each of said plurality of central processing units requires only one clock interval to access and communicate with said common memory unit.

* * * * *